Figure 1:
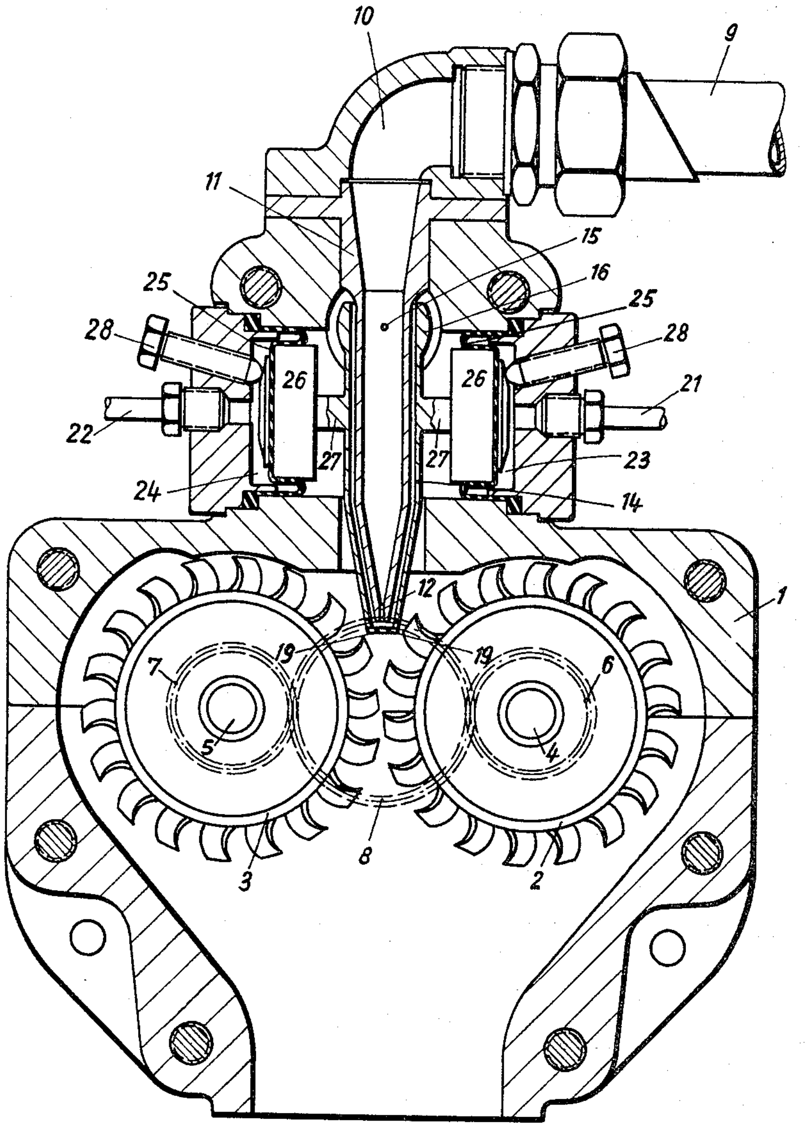

Feb. 16, 1965 A. MOOSMANN 3,169,746

FLUID PRESSURE OPERATED TURBINES

Filed Sept. 8, 1960 3 Sheets-Sheet 1

Inventor
Alois Moosmann
By
Watson, Cole, Grindle & Watson
Attys.

Feb. 16, 1965 A. MOOSMANN 3,169,746

FLUID PRESSURE OPERATED TURBINES

Filed Sept. 8, 1960 3 Sheets-Sheet 2

Inventor
Alois Moosmann
By
Watson, Cole, Grindle & Watson
Attys.

Inventor
Alois Moosmann
By Watson, Cole, Grindle & Watson
Attys.

United States Patent Office 3,169,746
Patented Feb. 16, 1965

3,169,746
FLUID PRESSURE OPERATED TURBINES

Alois Moosmann, 11 Muttergartenweg,
Stuttgart-Birkach, Germany

Filed Sept. 8, 1960, Ser. No. 54,645
Claims priority, application Germany, Sept. 11, 1959,
M 42,723
7 Claims. (Cl. 253—24)

This invention relates to a fluid pressure operated turbine which is particularly but not exclusively suitable for driving shifting devices for machine tools, for driving copying devices for lathes and grinding machines, for the adjustment of boring machines or the like. The turbine can however also be used as the driving means for positioning devices, control devices or for other purposes.

The free flow turbine according to the main specification has two turbine wheels which have parallel axes and are nearly in contact at their outer peripheries, which are coupled positively together via gearing and which are subjected tangentially to a jet of pressure medium which flows from a nozzle arranged in a medial plane between the shafts of the two wheels. The wheels are so coupled together that they have the same direction of rotation, and the jet of pressure medium can be directed selectively to one or other of the two wheels or to both rotors simultaneously.

It has already been proposed to arrange the nozzle itself so as to be pivotal in order to divert the jet of pressure medium from a central setting on to one or other of the two turbine wheels. This arrangement has the disadvantage that because of the frictional forces arising and the relatively large deflection required for diverting the nozzle it is not sufficiently sensitive. The object of the invention is to overcome these disadvantages.

The invention consists essentially in that the nozzle is fixedly arranged and that the jet of pressure medium can be diverted from the central axis of the nozzle on to one or other turbine wheel by the force of reaction of part of the jet which is diverted substantially at right angles to the axis of the nozzle by at least one knife edge which is insertible into the jet of pressure medium, substantially at right angles to the axis of the nozzle. Preferably two opposed knife edges are provided on the two sides of the jet of pressure medium.

The knife edges may be moved in various ways laterally into the jet of pressure medium. In a particularly advantageous form of the invention the knife edges are secured to the free end of a pivotal arm, the pivot point of which lies on the central axis of the nozzle. The pivotal arm may consist of a tube surrounding the fixed nozzle, the tube narrowing towards the outlet end of the nozzle and carrying the opposed knife edges at its free end. The movement of this pivotal arm may be effected in various ways e.g. pneumatically or electrically. The pivotal arm may for example be provided on both sides with pistons which are sealed by rolling diaphragms.

In a particularly advantageous form of the invention the fixed nozzle is essentially of flat rectangular cross section at its outlet so that the jet of pressure medium has imparted to it a correspondingly flat or ribbon-like cross section. The knife edges serving to deflect the jet of pressure medium have in this case straight edges which extend parallel to the longer sides of the rectangular cross section of the jet. In this way the movement of the knife edges necessary for deflecting the jet is substantially smaller than when the usual jet of circular cross section is used. The insertion of the knife edges into the jet of pressure medium requires no expenditure of force. Consequently the turbine can react very quickly and strongly to relatively weak control impulses.

Figure 2:
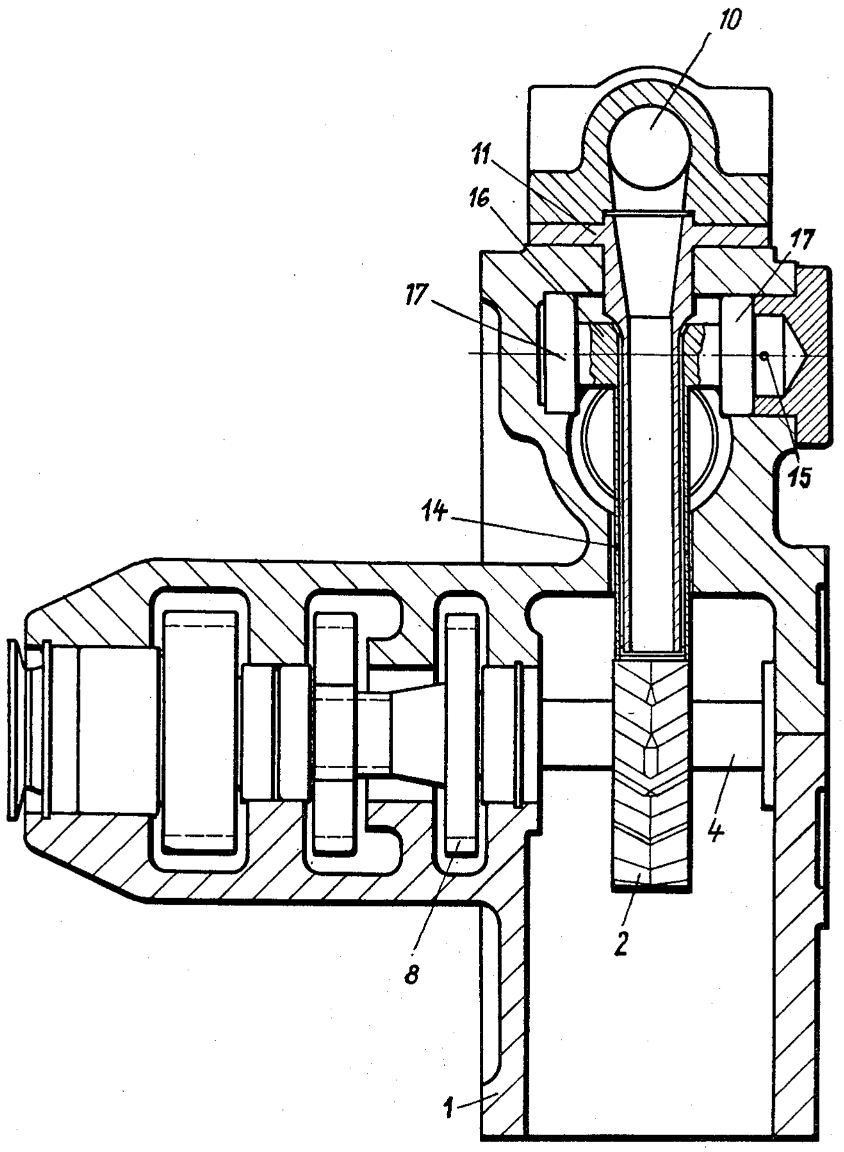
Figures 3, 5:
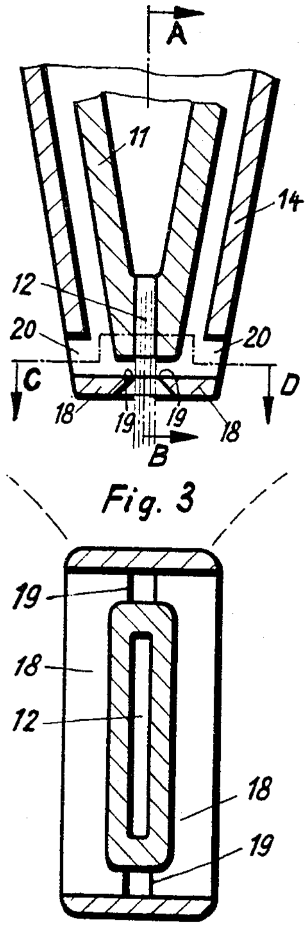
Figure 4:
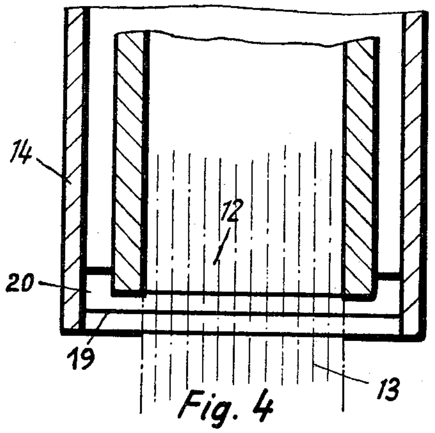
Figure 7:
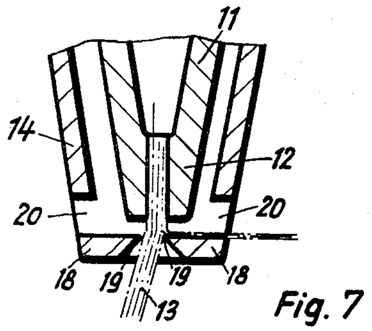
Figure 6:
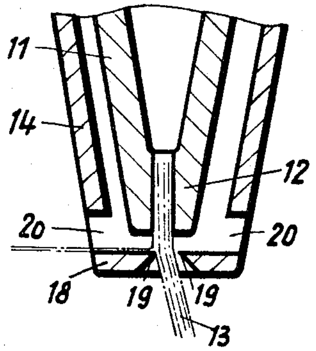

An embodiment of the invention is illustrated by way of example in the accompanying drawings, in which:

FIG. 1 is a view in cross section of an oil-driven turbine, taken in the plane of the turbine wheels and the nozzle, FIG. 2 is a longitudinal section through the oil-driven turbine, FIG. 3 shows on a larger scale the lower broken-off end of the nozzle with the knife edges in the central setting, FIG. 4 is a sectional elevation on the line A–B of FIG. 3, FIG. 5 is a horizontal section on the line C–D of FIG. 3, FIG. 6 is a section corresponding to FIG. 3 with the jet of pressure medium deflected to one side, and FIG. 7 is a section corresponding to FIG. 3 with the jet of pressure medium deflected to the other side.

The example illustrated is a turbine operating with oil at a pressure of for example 10 to 20 atmospheres, the use of oil pressure as the pressure medium being particularly advantageous. In a housing 1 two Pelton wheels 2 and 3 are so arranged that they are nearly in contact at their outer peripheries. The shafts 4 and 5 are journalled parallel to one another and are drivably connected to one another by pinions 6 and 7 and a gear wheel 8 in such manner that the two Pelton wheels 2 and 3 necessarily rotate in the same direction, i.e. the Pelton wheels both run either in clockwise sense or counterclockwise sense. Consequently the blades or buckets of the two Pelton wheels move in opposite directions at the place where the peripheries of the wheels nearly touch.

The oil under pressure is supplied through a pipe 9. A simple oil pump of constant output is suitable for example for feeding the oil. The oil flows through an elbow pipe 10 into a fixed nozzle 11 which narrows towards its outlet opening 12 so as to provide an outlet cross section which is substantially rectangular and flat. The jet of pressure medium 13 emerging from the nozzle opening 12 is shown in FIGS. 3 to 6.

Around the stationary nozzle 11 is arranged a tubular pivotal arm 14 which is mounted parallel to the shafts 4 and 5 of the rotors and is pivotal about an axis 15. For this purpose the pivotal tube 14 is connected to pivot pins 16 which are rotatably mounted in roller bearings 17.

At the lower free end of the pivotal tube 14 are arranged two opposed knife edge members 18 the knife edges 19 of which extend parallel to the long sides of the flat jet of pressure medium of rectangular cross section, as can be seen from FIGS. 3 to 5. Above the knife edge members 18 the pivotal tube 14 is provided with apertures 20 which extend transversely to the central axis of the nozzle 11.

The deflection of the pivotal tube 14 carrying the knife edge members 18 can be effected by any desired control impulses. In the embodiment illustrated pneumatic control impulses are used, being applied through compressed air pipes 21, 22. The pipes 21, 22 open into cylinder spaces 23, 24 which are sealed by diaphragms 25, which bear against pistons 26 which are connected by piston rods 27 to the pivotal tube 14. The deflections of the pistons 26 and therewith of the pivotal tube 14 are limited by adjustable stops formed by screws 28.

In the central setting of the pivotal tube 14 the knife edge members 18 take up the position illustrated in FIGS. 3 to 5, in which the knife edges 19 allow the jet 13 of pressure medium to pass without touching them. The jet 13 consequently flows directly centrally between the two Pelton wheels 2, 3 into the turbine housing and acts similarly on the blades of the two Pelton wheels. Consequently the wheels remain at rest. By means of pressure impulses applied through the pipes 21, 22 and effective in the cylinders 23, 24 the pistons 26 can be shifted to the left or to the right from the central balanced position. Thereby the pivotal tube 14 is moved either to the right (FIG. 6) or to the left (FIG. 7), so that either the left-hand knife member 18 or the right-hand knife edge member 18 has its knife edge 19 inserted into the jet 13. In this way a small part of the jet of pressure medium is cut off and diverted outwardly through the associated opening 20, as shown. The force of reaction arising in this manner deflects the jet 13 to one side or the other as is shown in FIGS. 6 and 7 respectively. Consequently either the Pelton wheel 2 or the Pelton wheel 3 is acted on more strongly by the jet so that the turbine is set in motion in one direction of rotation or the other.

Since the pivotal tube 14 is rotatably mounted at pivot 15 on the central axis of the stationary nozzle 11, the tube 14 can swing freely about the axis 15. Consequently extremely small adjusting forces or pressure differences in the cylinders 23, 24 suffice to move the knife edge members 18 out of the central setting into one or other operative position. Due to the narrow ribbon-like cross section of the jet 13 and the correspondingly straight formation of the knife edges 19, the latter are caused by quite small deflections of a few tenths of a millimetre to penetrate sufficiently far into the jet 13 to bring about the desired deflection of the jet.

I claim:

1. A fluid pressure operated turbine, especially for machine tools, comprising a housing, two impeller-type turbine wheels having parallel axes and mounted in the housing with their peripheries almost touching at a point in the medial plane between said axes, gearing means coupling said impeller wheels together and coupling said impeller wheels positively together so that in motion said impeller wheels rotate in the same direction, adjustable jet means for directing a jet of fluid medium under pressure onto at least either of said two impeller wheels, said jet of pressure fluid medium flowing from a nozzle fixedly arranged in the medial plane between the axes of said turbine wheels, movable diverting means comprising at least one knife edge arranged on a knife edge member, said knife edge being insertable into said jet substantially at right angles to the axis of said nozzle, at least one opening above said knife edge member extending substantially at right angles to the longitudinal axis of said nozzle, said jet of pressure fluid medium being deflectable away from the center axis of said nozzle on one of said turbine wheels by the force of reaction of said part of said jet which is diverted by said diverting means substantially at right angles to the axis of said nozzle.

2. A turbine according to claim 1, in which two oppositely arranged knife edge members are provided, said knife edge members having one knife edge on each side of said jet.

3. A turbine according to claim 1, in which two oppositely aranged knife edge members are provided, said knife edge members having one knife edge on each side of said jet, and said knife edge members being carried by the free end of a pivotal arm the pivot axis of which is at right angles to the nozzles axis.

4. A turbine according to claim 1, in which a pivotal tube with two oppositely arranged knife edge members are provided, said knife edge members having one knife edge on each side of said jet, and said knife edge members being carried by the free end of the pivotal tube the pivot axis of which is at right angles to the nozzle axis.

5. A turbine according to claim 1, in which said nozzle has an outflow cross section of substantially rectangular and flat form to impart to said jet of pressure medium a corresponding flat ribbon-like cross section, and in which said knife edges extend parallel to the longer sides of said rectangular cross section of said jet.

6. A turbine according to claim 1, in which two oppositely arranged knife edge members are provided, said knife edge members having one knife edge on each side of said nozzle, said nozzle having an outflow cross section of substantially rectangular and flat form to impart to said jet of pressure medium a corresponding flat ribbon-like cross section, and said knife edges extending parallel to the longer sides of said rectangular cross section of said jet.

7. A fluid pressure operated turbine according to claim 6 in which a tube is provided which is mounted on a pivot axis and having openings in said tube above and below its longitudinal axis, said knife edge members being mounted on and carried by the pivotal tube and surrounding the tube with the knife edges at a nozzle end of the tube.

References Cited in the file of this patent

UNITED STATES PATENTS

| | | |
|---|---|---|
| 431,739 | Buhlman | July 8, 1890 |
| 875,515 | Frauenthal | Dec. 31, 1907 |
| 1,422,700 | Hacking | July 11, 1922 |
| 1,462,070 | Parmenter | July 17, 1923 |
| 1,590,912 | Scanavino | June 29, 1926 |
| 1,608,565 | Pitman | Nov. 30, 1926 |
| 2,007,602 | Goodspeed | July 9, 1935 |
| 2,620,622 | Lundberg | Dec. 6, 1952 |
| 2,694,898 | Stauff | Nov. 23, 1954 |
| 2,976,687 | Nichols | Mar. 28, 1961 |

FOREIGN PATENTS

| | | |
|---|---|---|
| 673,159 | France | Oct. 7, 1929 |
| 1,184,145 | France | July 17, 1959 |